(12) United States Patent
Lee et al.

(10) Patent No.: US 10,841,654 B2
(45) Date of Patent: Nov. 17, 2020

(54) APPARATUS AND METHOD FOR DISPLAYING IMAGES AND PASSENGER DENSITY

(71) Applicant: HANWHA TECHWIN CO., LTD., Seongnam-si (KR)

(72) Inventors: Ho Woong Lee, Seongnam-si (KR); Han Sang Kim, Seongnam-si (KR); Min Suk Sung, Seongnam-si (KR); Min Gyu Lee, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/463,621

(22) PCT Filed: Dec. 7, 2016

(86) PCT No.: PCT/KR2016/014317
§ 371 (c)(1),
(2) Date: May 23, 2019

(87) PCT Pub. No.: WO2018/097384
PCT Pub. Date: May 31, 2018

(65) Prior Publication Data
US 2020/0186743 A1    Jun. 11, 2020

(30) Foreign Application Priority Data
Nov. 24, 2016   (KR) .................. 10-2016-0157020

(51) Int. Cl.
*H04N 21/47*   (2011.01)
*G06K 9/00*   (2006.01)
(Continued)

(52) U.S. Cl.
CPC ......... *H04N 21/47* (2013.01); *G06K 9/00778* (2013.01); *G06K 9/00832* (2013.01);
(Continued)

(58) Field of Classification Search
None
See application file for complete search history.

(56) References Cited

U.S. PATENT DOCUMENTS

| | | | |
|---|---|---|---|
| 9,390,335 B2 * | 7/2016 | Lee | G06T 7/20 |
| 2007/0151808 A1 * | 7/2007 | Amano | B66B 5/0012 187/391 |

(Continued)

FOREIGN PATENT DOCUMENTS

| | | | | |
|---|---|---|---|---|
| CN | 204650749 U | * | 9/2015 | G08G 1/01 |
| CN | 109117788 A | * | 1/2019 | G06K 9/00 |

(Continued)

OTHER PUBLICATIONS

International Search Report dated Jul. 27, 2017, issued in International Application No. PCT/KR2016/014317.

*Primary Examiner* — Reza Aghevli
(74) *Attorney, Agent, or Firm* — H.C. Park & Associates, PLC

(57) ABSTRACT

The present invention relates to an apparatus and method for displaying images and a passenger density. The apparatus includes a receiver receives original images obtained by a plurality of cameras respectively installed in a plurality of passenger cars and a passenger density calculated from the original images; a thumbnail generator for determining the sizes of thumbnail images corresponding to the original images according to the number of cameras and generating thumbnail images according to the determined sizes; and a screen for collecting the thumbnail images and displaying the thumbnail images together with information indicating the density.

18 Claims, 14 Drawing Sheets

(51) Int. Cl.
*G08B 21/22* (2006.01)
*H04N 7/18* (2006.01)
*H04N 21/431* (2011.01)

(52) U.S. Cl.
CPC ............. *G08B 21/22* (2013.01); *H04N 7/181* (2013.01); *H04N 21/4316* (2013.01)

(56) References Cited

U.S. PATENT DOCUMENTS

| | | | | |
|---|---|---|---|---|
| 2010/0316257 | A1* | 12/2010 | Xu | G06K 9/3241 |
| | | | | 382/103 |
| 2010/0322516 | A1* | 12/2010 | Xu | G06K 9/00778 |
| | | | | 382/173 |
| 2012/0189273 | A1* | 7/2012 | Folgner | H04N 21/2187 |
| | | | | 386/241 |
| 2013/0302005 | A1* | 11/2013 | Harwell | H04N 21/6175 |
| | | | | 386/200 |
| 2015/0016715 | A1* | 1/2015 | Isago | G06Q 10/10 |
| | | | | 382/155 |
| 2015/0324636 | A1* | 11/2015 | Bentley | A63F 13/00 |
| | | | | 386/227 |
| 2016/0073061 | A1* | 3/2016 | Dillow | G06Q 30/08 |
| | | | | 348/148 |
| 2016/0125248 | A1* | 5/2016 | Lee | G06T 7/62 |
| | | | | 382/103 |
| 2016/0292881 | A1* | 10/2016 | Bose | G06K 9/00711 |
| 2016/0322078 | A1* | 11/2016 | Bose | A63F 13/217 |
| 2017/0006328 | A1* | 1/2017 | Verticchio | H04N 21/2187 |
| 2017/0262697 | A1* | 9/2017 | Kaps | G11B 27/022 |
| 2019/0124301 | A1* | 4/2019 | Yoshii | H04N 7/18 |

FOREIGN PATENT DOCUMENTS

| | | | | |
|---|---|---|---|---|
| CN | 109190507 | A * | 1/2019 | ................ G06K 9/00 |
| CN | 109241858 | A * | 1/2019 | ................ G06K 9/00 |
| CN | 109446920 | A * | 3/2019 | ................ G06K 9/00 |
| CN | 109961539 | A * | 7/2019 | ................ G07C 9/00 |
| CN | 109977927 | A * | 7/2019 | ................ G06K 9/00 |
| CN | 110285858 | A * | 9/2019 | ............ G01D 21/02 |
| EP | 2375380 | A1 * | 10/2011 | ........... G06T 7/0004 |
| JP | 2014-038601 | | 2/2014 | |
| JP | 2014038601 | A * | 2/2014 | ............ G06T 11/80 |
| JP | 2014-054899 | | 3/2014 | |
| JP | 2014054899 | A * | 3/2014 | ............ B61L 25/02 |
| JP | 2018002037 | A * | 1/2018 | ............ B61L 25/02 |
| KR | 10-2010-0067459 | | 6/2010 | |
| KR | 20100067459 | A * | 6/2010 | ............ B61L 25/02 |
| KR | 10-1011950 | | 1/2011 | |
| KR | 10-2011-0093076 | | 8/2011 | |
| KR | 20120105795 | A * | 9/2012 | ............. B61L 25/04 |
| KR | 20150067018 | A * | 6/2015 | ............. G06Q 50/30 |
| KR | 101714723 | B1 * | 3/2017 | ............. G06Q 50/30 |
| KR | 101737738 | B1 * | 5/2017 | ................ G06K 9/00 |
| KR | 20180088962 | A * | 8/2018 | ............. B61L 27/00 |

\* cited by examiner

APPARATUS AND METHOD FOR DISPLAYING IMAGES AND PASSENGER DENSITY

CROSS REFERENCE TO RELATED APPLICATION

This application is a National Stage Entry of International Application No. PCT/KR2016/014317, filed on Dec. 7, 2016, and claims priority from and the benefit of Korean Patent Application No. 10-2016-0157020, filed on Nov. 24, 2016, of which is hereby incorporated by reference for all purposes as if fully set forth herein.

BACKGROUND

Field

The present invention relates to an apparatus and method for providing a density, and more particularly, to an apparatus and method for providing a density by measuring a density in a passenger car and displaying the density together with an image of an inside of the passenger car.

Discussion of the Background

Generally, surveillance systems are widely used in various places including banks, department stores, and residential areas. Such surveillance systems may be used for the purpose of crime prevention and security and, recently, are also used for real-time monitoring of indoor pets or child. In addition, a system which is most commonly used as the surveillance system is a closed-circuit television (CCTV) system in which a camera is installed at an appropriate position so as to capture an image of a region desired to be monitored and which allows a user to perform surveillance by monitoring the image captured by the camera.

Images captured by a surveillance camera may be used to monitor a certain region and, from information about the images, may also be used to count the number of people in a corresponding space or measure the amount of traffic passing through a certain point.

Conventionally, surveillance cameras installed in public transportation such as buses and subways are mostly used to record images in order to use the images as evidence when an accident occurs. However, due to the development of image processing technology, the surveillance cameras are being used for various purposes. In particular, with regard to the purpose of transportation, attempts have been made to monitor traffic conditions in real-time and provide useful traffic information.

In the case of a train or subway with several passenger cars, it is necessary to inform passengers and managers of the information about how crowded each passenger car is. When passengers are boarding a specific passenger car without knowing such information, the passengers cannot be efficiently transported due to overcrowding and the passengers who boarded the overcrowded passenger car may feel uncomfortable.

Therefore, it is necessary for the manager to take an appropriate measure according to a density in the passenger car, and it is necessary to provide an apparatus and method for monitoring the density to aid in such a measure. The density is a numerical value indicating the number of boarded passengers relative to the maximum number of passengers that can board in a limited space of a passenger car. The density is not defined by any one method, and an area of a region in which the passengers have being boarded relative to a total area may be represented as the density, or the number of boarded passengers relative to the maximum number of passengers may be represented as the density.

The above information disclosed in this Background section is only for understanding of the background of the inventive concepts, and, therefore, it may contain information that does not constitute prior art. [the end of discussion].

SUMMARY

The present invention is directed to an apparatus for displaying images and a passenger density in which a density is measured from an image of an inside of a passenger car and displayed.

Additional features of the inventive concepts will be set forth in the description which follows, and in part will be apparent from the description, or may be learned by practice of the inventive concepts.

According to one aspect of the present invention, an apparatus for displaying images and a passenger density includes a receiver to receive original images obtained by a plurality of cameras installed in a plurality of passenger cars and a passenger density calculated from the original images; a thumbnail generator to determine sizes of thumbnail images corresponding to the original images according to the number of the plurality of cameras and to generate thumbnail images according to the determined sizes; and a screen to collect the thumbnail images and to display the thumbnail images together with information indicating the passenger density.

The thumbnail generator may be operable to determine the sizes of the thumbnail images according to the passenger density and to generate the thumbnail images according to the determined sizes.

The apparatus may further include an event detector to detect an event based on the original images and the passenger density, and the screen may further be operable to display an alarm on the thumbnail image corresponding to the original image in which the event is detected.

The apparatus may further include a storage to store the original images as a first profile, and the storage may be operable to store the original image in which the event is detected as a second profile.

The event detector may be operable to detect an event defined by a change of the density is greater than or equal to a threshold value for a predetermined period of time.

The screen may be operable to further display a selection window and may receive information indicating the detected event and whether the original image in which the event is detected is transmitted from a user.

The screen may include a plurality of display devices.

The screen may be operable to sequentially display the thumbnail images for a predetermined time.

The apparatus may further include an air conditioner controller to control an air conditioner so as to adjust a temperature in one of the plurality of passenger cars using a temperature in the one of the plurality of passenger cars, the temperature of the one of the plurality of passenger cars being calculated from the passenger density of the one of the plurality of passenger cars.

According to another aspect of the present invention, an apparatus for displaying images and a passenger density includes a receiver to receive original images obtained by a plurality of cameras installed in a plurality of passenger cars; a passenger density calculator to calculate a passenger density in each of the plurality of passenger cars from the original images; a thumbnail generator to determine sizes of thumbnail images corresponding to the original images according to the number of the plurality of cameras and to generate thumbnail images according to the determined sizes; and a screen to collect the generated thumbnail images and to display the thumbnail images together with information indicating the passenger density.

According to still another aspect of the present invention, a method of displaying images and a passenger density includes receiving, by a receiver, original images obtained by a plurality of cameras each installed in a plurality of passenger cars and a passenger density calculated from each of the original images; determining, by a thumbnail generator, sizes of thumbnail images corresponding to the original images according to the number of the plurality of cameras; generating, by the thumbnail generator, thumbnail images according to the determined sizes; and collecting, by a screen, the thumbnail images and displaying the thumbnail images together with information indicating the passenger density.

The step of determining of the sizes of the thumbnail images may include the step of determining the sizes of the thumbnail images according to the passenger density.

The method may further include the step of detecting, by an event detector, an event based on the original images and the passenger density, and the displaying of the thumbnail images by the screen may include further the step of displaying an alarm on the thumbnail image corresponding to the original image in which the event is detected.

The method may further include the step of storing, by a storage, the received original images as a first profile.

The step of storing of the received original images may include storing the original image in which the event is detected as a second profile.

The step of detecting of the event may include detecting an event when a change of the passenger density is greater than or equal to a threshold value for a predetermined period of time.

The step of displaying of the thumbnail images may include the steps of displaying, by the screen, a selection window; and receiving information indicating the event and whether the original image in which the event is detected is transmitted from a user.

The step of displaying of the thumbnail images by the screen may include the steps of dividing and displaying the thumbnail images on a plurality of display devices included in the screen together with the information indicating the passegner density.

The step of displaying of the thumbnail images may include the step of sequentially displaying the thumbnail images for a predetermined time.

The method may further include the step of controlling an air conditioner so as to adjust a temperature in one of the plurality of passenger cars using a temperature in the one of the plurality of passenger cars, the temperature of the one of the plurality of passenger cars is calculated from the passenger density of the one of the plurality of passenger cars.

Other specific details of the invention are included in the detailed description and the drawings.

According to embodiments of the present invention, at least the following effects are obtained.

It is possible to effectively inform a manager of a density of a passenger car to allow the manager to efficiently cope with a situation that has occurred.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
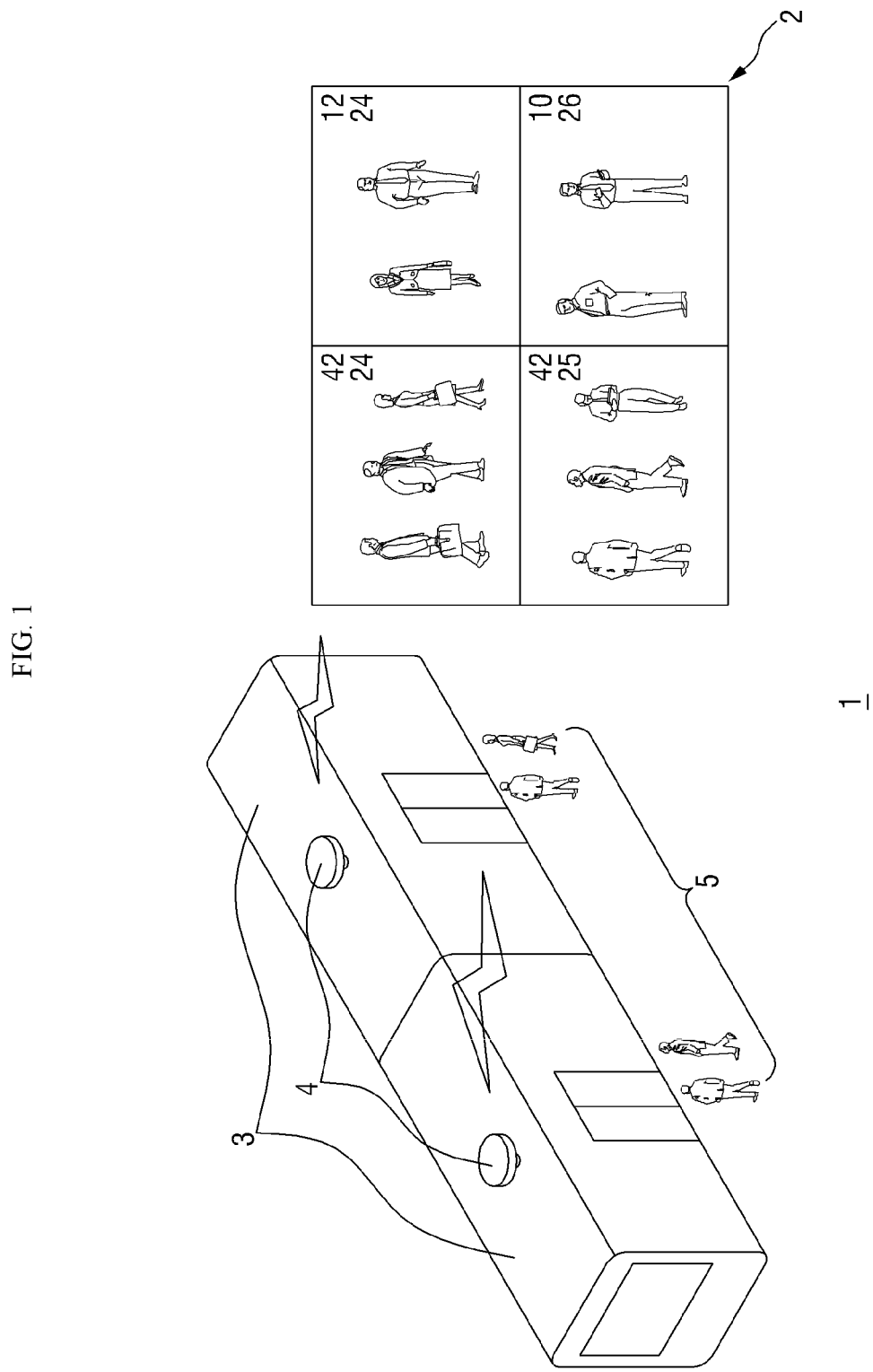
FIG. 1 is a schematic view showing an overall configuration of a system for providing a passenger density according to an embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein Hereinafter, exemplary embodiments of the invention will be described in detail with reference to the accompanying drawings.

FIG. 1 is a schematic view showing an overall configuration of a system 1 for providing a passenger density according to an embodiment of the present invention.

Referring to FIG. 1, it can be seen that the system 1 for providing a passenger density according to the embodiment of the present invention includes a camera 4 installed in a passenger car 3 and an apparatus 2 for providing a passenger density which communicates with the camera 4.

The passenger car 3 refers to one car of a subway or train which is configured to allow passengers 5 to board and move. The passenger car 3 may be composed of a plurality of passenger cars to constitute an entire train, and the plurality of passenger cars 3 may be connected in series to constitute one complete train.

The camera 4 is installed in the passenger car 3. One camera 4 may be installed for each passenger car 3 or a plurality of cameras 4 may be installed in one passenger car 3 to capture images of more various situations of an inside of the passenger car 3. The camera 4 may be installed on a ceiling of the passenger car 3 to capture images of all of the passengers 5 located in the passenger car 3.

Various types of cameras, such as a zoom-type camera, a dome-type camera, a pan-tilt-zoom (PTZ) camera, an infrared (IR) camera, a fish-eye camera, and the like, may be used as the cameras 4 which are used in the present invention, but the present invention is not limited to the listed cameras. The camera 4 installed in the passenger car 3 is configured to be capable of wireless communication with the apparatus 2 and to transmit the captured images to the apparatus 2 for providing a passenger density.

A screen 23 of the apparatus 2 for providing a density according to the embodiment of the present invention converts the received image into thumbnail images, and displays and transmits the thumbnail images together with passenger density information to a user through a display device.

Detailed configurations and operations of the apparatus 2 for providing a passenger density and the camera 4 will be described with reference to FIGS. 2 and 3, respectively.

Figure 2:
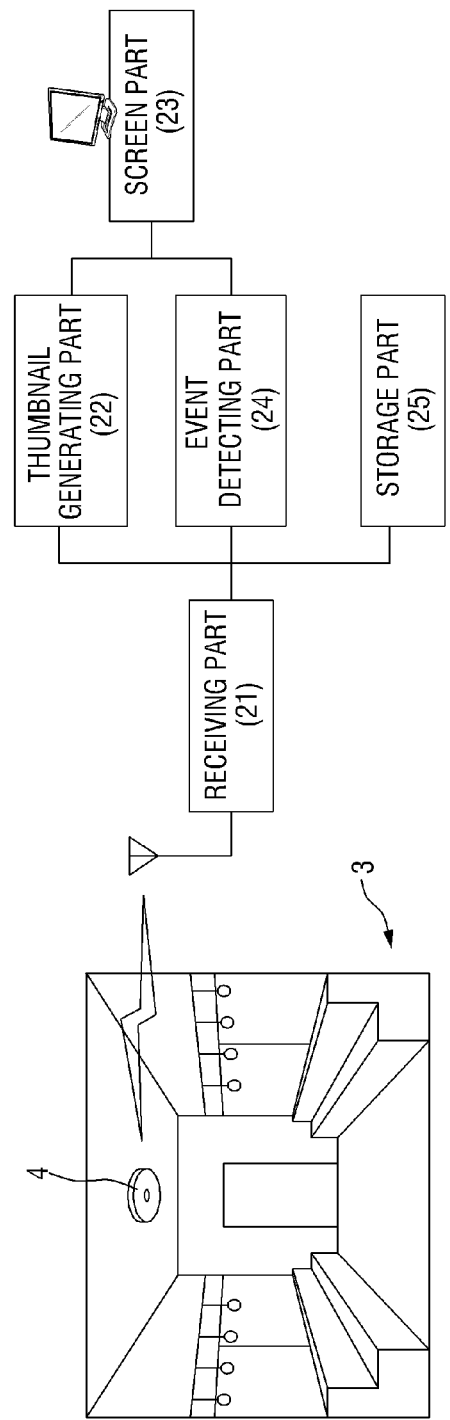
FIG. 2 is a block diagram showing a configuration of an apparatus for providing a passenger density according to an embodiment of the present invention.

FIG. 2 is a block diagram showing the configuration of the apparatus 2 for providing a passenger density according to the embodiment of the present invention.

Referring to FIG. 2, it can be seen that the apparatus 2 for providing a passenger density according to the embodiment of the present invention includes a receiver 21, a thumbnail generator 22, the screen 23, an event detecting part 24, and a storage 25 calculator The apparatus 2 for providing a passenger density serves to inform a user of information about a passenger density, and convert and display a captured original image. Therefore, the apparatus 2 for providing a passenger density may be a device such as a content management system (CMS), which is an image management system of the surveillance camera, but the present invention is not limited thereto.

The receiver 21 serves to receive the original image and the passenger density, which are transmitted from the camera 4, through wireless communication. Therefore, the receiver 21 may be configured as a third-generation (3G) modem or a long-term evolution (LTE) modem for wireless communication or may use ZigBee, a wireless local area network (WLAN), Bluetooth, or the like.

The receiver 21 receives the captured original image and the passenger density calculated from the original image from the camera 4, and transmits the received information to the thumbnail generator 22, the event detector 24, and the storage 25 which are included in the apparatus 2 for providing a passenger density.

The thumbnail generator 22 is a component which serves to generate a thumbnail image based on the original image received from the receiver 21. The original image is composed of a profile having a high resolution and a high frame rate so that it is difficult to display a plurality of original images on a single screen. Therefore, a single screen is divided and thumbnail images, which are generated according to a profile having a low resolution and a low frame rate, are displayed such that a plurality of images may be displayed in a small size. Here, the profile refers to conditions for composing images and, generally, includes a resolution, a codec type, and a frame rate as main determining factors, but the present invention is not limited thereto.

The thumbnail generator 22 may generate a thumbnail image from the received original image. One thumbnail image may be generated corresponding to one original image, and a plurality of thumbnail images may be generated corresponding to one original image.

The thumbnail generator 22 may determine a size of the thumbnail image based on the received passenger density and whether an event is detected which is received from the event detector 24. Generally, most of the thumbnail images may be configured to be smaller than the original image. However, the thumbnail images may be generated to be larger than the original image according to the passenger density of the corresponding original image, a change of the passenger density, and whether an event is detected.

The thumbnail generator 22 determines the sizes of the thumbnail images and constructs a layout for efficiently arranging the thumbnail images on the screen. Generally, the plurality of thumbnail images may be configured to have the same size, a layout equally divided by the number of the thumbnail images may be constructed, and each of the thumbnail images may be arranged. When the sizes of some thumbnail images are different from other thumbnail images, a deformed layout may be constructed. The layouts will be described below in detail with reference to FIGS. 6 and 7.

The event detector 24 is a component for informing the user that something unusual has occurred by assuming a notable change on the received original image as an event. The event refers to a situation in which a significant change to be observed has occurred in the original image desired to be observed. Therefore, it is possible to assume a situation in which an event such as movement of an object desired to be observed or a sudden change in passenger density has occurred, but the present invention is not limited thereto. When the situation is known to one skilled in the art and is of interest by the user, another event situation may be assumed.

The storage 25 is a component for storing the original image. Therefore, a storage medium for storing the original image which is digitized into data may be used as the storage 25. Storage media that can be used as the storage 25 may include a hard disk drive (HDD), a solid state drive (SSD), a compact flash (CF), a secure digital (SD) card, and the like, but a type thereof is not limited thereto.

The original image is stored in the storage 25 as a first profile. Generally, in an image management apparatus, a live profile for playing an image and a record profile for storing an image are configured separately. Therefore, here, the first profile is a record profile. However, when an event is detected by the event detector 24, a corresponding original image may be stored in the storage 25 as a second profile. In this case, the second profile may be a profile that occupies more capacity when capturing for the same time compared to the first profile. This is to store a high-quality original image and record a remarkable situation in more detail.

The original image stored in the storage 25 may be provided such that the user may access and browse through the original images later through a retrieval part (not shown) included in the apparatus 2 for providing a passenger density and may be provided as evidence when the original image needs to be provided to a related government office or the like in a situation in which an event has occurred, which will be described below.

The thumbnail generator 22 and the event detector 24 described above should be able to perform basic logical operations. Therefore, a semiconductor device capable of logical operation, such as a central processing unit (CPU), a microcontroller unit (MCU), a microprocessor, a field programmable gate array (FPGA), an application specific integrated circuit (ASIC), or the like, may be used, but the present invention is not limited thereto.

The screen 23 is a component for displaying the generated thumbnail image and the information about the passenger density. The screen 23 displays the size of the thumbnail image, which is determined in the thumbnail generator 22, according to the layout determined in the thumbnail generator 22 and displays the information about the passenger density corresponding to the thumbnail image together with the corresponding thumbnail image.

The screen 23 may be a portable and mobile device which includes a display device for displaying an image, such as a smartphone, a tablet personal computer (PC), or a laptop computer, but the present invention is not limited thereto, and the screen 23 may be a device which is not easy to move, such as a desktop computer, a video wall, or the like.

The apparatus 2 for providing a passenger density according to the embodiment of the present invention may not provide a touch function, and in this case, an input unit is separately provided. Generally, an input unit which is most commonly used includes a mouse, a keyboard, a joystick, and a remote control. When the apparatus 2 for providing a passenger density provides the touch function, the screen 23 may include a touch sensor. The touch sensor may be mounted integrally with the screen 23 or may not be integrated. The touch sensor senses a touch generated on the screen 23 and detects coordinates of a region in which the touch is generated, the number of touches, an intensity of the touch, and the like. Even when the apparatus 2 for providing a passenger density provides the touch function, a separate touch pad may be provided when the screen 23 does not include a touch sensor. The touch may be performed using a finger, but the present invention is not limited thereto, and the touch may be performed using a stylus pen or the like equipped with a tip through which a minute current can flow. Such a user input is made through the screen 23.

Figure 3:
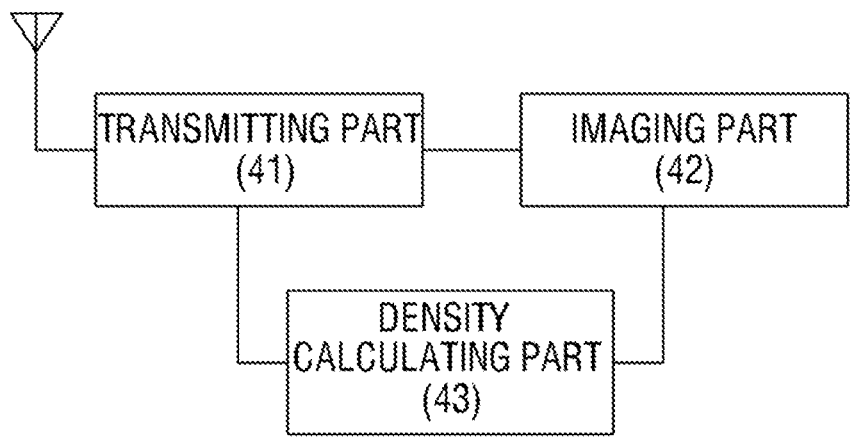
FIG. 3 is a block diagram showing a configuration of a camera included in the system for providing a passenger density according to the embodiment of the present invention.

FIG. 3 is a block diagram showing the configuration of the camera 4 included in the system 1 for providing a passenger density according to the embodiment of the present invention.

Referring to FIG. 3, it can be seen that the camera 4 used in the system 1 for providing a passenger density according to the embodiment of the present invention includes an imaging part 42, a passenger density calculator 43, and a transmitting part 41.

The imaging part 42 is a general configuration of the camera 4 and is generally located at a front portion of the camera 4. The imaging part 42 includes a lens system for receiving and collecting light and an image sensor for obtaining a valid signal from the light collected by the lens system. The imaging part 42 may further include an addition optical filter such as a day and night (D/N) filter or the like. A charge-coupled device (CCD), a complementary metal-oxide-semiconductor (CMOS), or the like may be used as the image sensor, but the present invention is not limited thereto.

The imaging part 42 captures an image of a subject in the surroundings. The imaging part 42 transmits the captured image to an encoder to form an original image in a form that can be stored.

An encoder is a component for forming an optical signal sensed by an image sensor in a form that can be stored and may include a video encoder such as a video graphics array (VGA) encoder or the like. The optical signal is processed as an original image, which is data in a form that can be reproduced, by passing through the video encoder to be stored or transmitted.

The passenger density calculating part 43 is a component for calculating a passenger density from the captured original image. Therefore, the passenger density calculator 43 receives the captured original image from the imaging part 42 and calculates the passenger density using various image recognition methods.

There are various methods by which the passenger density calculator 43 calculates the passenger density. The passenger density calculator 43 may use a method in which trajectories of the passenger 5 which is a dynamic object in the captured image are accumulated to generate a heat map composed of graphics in the form of a thermal distribution and an area in which the passenger 5 is located in an entire area is determined based on the heat map to calculate the passenger density.

The passenger density calculator 43 may extract a region corresponding to the passenger 5 from the captured image of the inside of the passenger car 3 using a method such as eigenfaces, fisherfaces, speeded up robust features (SURF), features from accelerated segment test (FAST), or the like. However, the method of recognizing the region corresponding to the passenger 5 is not limited thereto. When the region in which the passenger 5 is located is extracted, the passenger density may be calculated by calculating a ratio of the region in which the passenger 5 is located to an entire region of the passenger car 3.

The method by which the passenger density calculator 43 calculates the number of passengers 5 in the passenger car 3 or an area occupied by the passengers 5 from the captured original image and calculates the passenger density is not limited to the listed examples. Another example thereof will be described in detail with reference to FIG. 4.

The passenger density calculator 43 should be able to perform a basic logical operation. Therefore, a semiconductor device capable of logical operation, such as a CPU, an MCU, a microprocessor, an FPGA, an ASIC, or the like may be used as the passenger density calculator 43, but the present invention is not limited thereto.

In the present invention, the passenger density calculator 43 in which the passenger density calculation is performed is described as being included in the camera 4 but may be included in the apparatus 2 for providing a passenger density. In this case, the apparatus 2 for providing a passenger density receives only the captured original image from the camera 4 and the passenger density calculator included in the apparatus 2 for providing a passenger density calculates the passenger density.

The transmitting part 41 serves to transmit the original image captured by the camera 4 and the passenger density calculated by the passenger density calculator 43 to the apparatus 2 for providing a passenger density through wireless communication. Therefore, the transmitting part 41 may be configured as a 3G modem or an LTE modem for wireless communication, or may use ZigBee, a WLAN, Bluetooth, or the like.

Hereinafter, an example will be described with reference to FIG. 4 in which the number of passengers 5 is calculated from the captured image to measure a passenger density.

Figure 4:
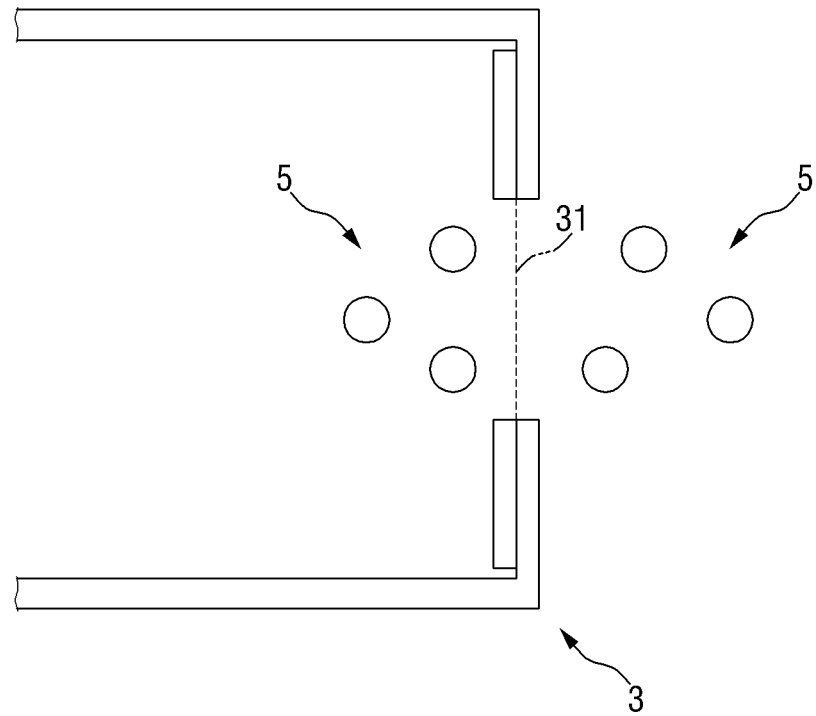
FIG. 4 is a plan view showing a method of measuring the number of passengers using a camera of the apparatus for providing a passenger density according to the embodiment of the present invention.

FIG. 4 is a plan view showing a method of measuring the number of passengers 5 using the camera 4 of the apparatus 2 for providing a passenger density according to the embodiment of the present invention.

FIG. 4 is a plan view of an inside of the passenger car 3 when viewed from above, which shows a state in which a door of the passenger car 3 opens. The passengers 5 are shown as circles.

When the camera 4 is installed in the inside of the passenger car 3 to capture images of the inside of the passenger car 3 and a doorway region of the passenger car 3, an imaginary line 31 may be assumed in the doorway region of the passenger car 3. The camera 4 may recognize the passenger 5 using the above-described image recognition method and track the movement of an object corresponding to the passenger 5 so that it can be recognized that the passenger 5 crosses the imaginary line 31. It can be seen that the number of persons in the passenger car 3 decreases when the object corresponding to the passenger 5 crosses the imaginary line 31 outward, and it can be seen that the number of persons in the passenger car 3 increases when the object corresponding to the passenger 5 crosses the imaginary line 31 inward. Accordingly, the number of persons in the passenger car 3 may be known and the passenger density calculator 43 may calculate a passenger density based on the number of persons.

Hereinafter, an image displayed by the screen 23 will be described with reference to FIG. 5.

Figure 5:
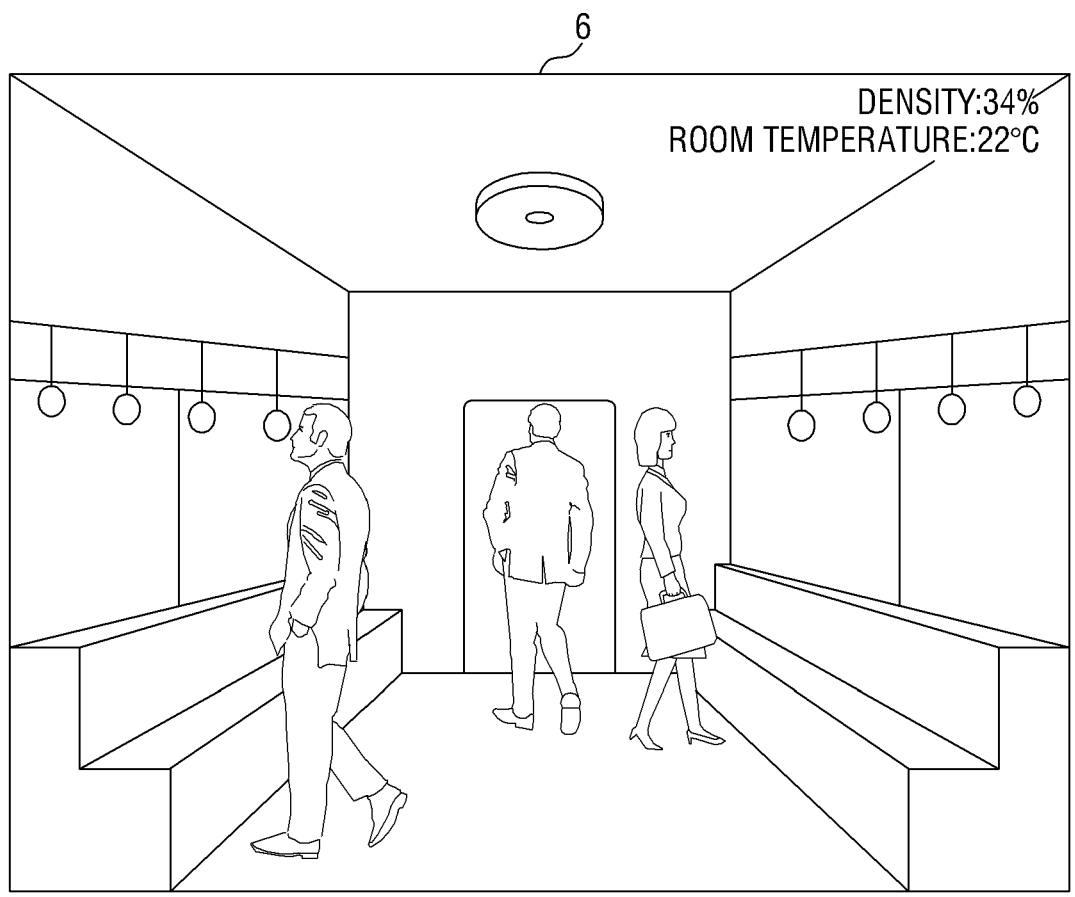
FIG. 5 is a view showing a thumbnail image and density information which are displayed by a screen of the apparatus for providing a passenger density according to the embodiment of the present invention.

FIG. 5 is a view showing a thumbnail image 6 and passenger density information, which are displayed by the screen 23 of the apparatus 2 for providing a passenger density according to the embodiment of the present invention.

Referring to FIG. 5, the screen 23 of the apparatus 2 for providing a passenger density according to the embodiment of the present invention may display the thumbnail image 6 together with the passenger density information. The thumbnail image 6 is generated based on the original image. A plurality of cameras 4 may be installed in one passenger car 3, and FIG. 5 shows a state in which an image captured by one camera 4 installed on one side surface of the passenger car 3 among two cameras 4 is deformed into the thumbnail image 6 and the deformed thumbnail image 6 is displayed. A passenger density may be calculated from an image captured by a camera 4 installed at a ceiling among the plurality of cameras 4 or may be calculated from the original image corresponding to the thumbnail image 6 shown in FIG. 5.

The passenger density information may be a numerical value calculated as a percentage as described in the embodiment or may be a fraction type numerical value indicating the maximum number of passengers and the current number of passengers, but the present invention is not limited thereto. In addition to the passenger density, a current room temperature may be calculated and displayed. Information about the displayed room temperature may be obtained by measuring a temperature in the passenger car 3 using an IR camera 4 or a temperature sensor, may be corrected by combining the measured value with the passenger density information, or may be simply calculated using only the passenger density information.

In FIG. 5, the passenger density information and the room temperature information are being displayed in an upper right corner of the thumbnail image 6, but positions for displaying the passenger density and the related information are not limited thereto.

The apparatus 2 for providing a passenger density of the present invention may further include an air conditioner controller to control an air conditioner in the passenger car 3 in order to maintain an appropriate room temperature corresponding to the room temperature information obtained in the above manner. The air conditioner control part is configured to exchange a control signal with the air conditioner installed in the passenger car 3 and transmits the control signal to the air conditioner to perform cooling and heating at a set temperature. Therefore, it is possible to automatically maintain an appropriate temperature for each passenger car 3.

The apparatus 2 for providing a passenger density of the present invention may further include a passenger density providing control part to transmit the passenger density of each passenger car 3 to a station in which the passenger car 3 will arrive. The passenger density providing control part may communicate with an electric signboard installed in a platform of each station and transmit the passenger density of the passenger car 3 to display the passenger density on the electric signboard in advance so as to allow the passengers 5 to board the passenger car 3 while avoiding the crowded passenger car 3.

The screen 23 of the apparatus 2 for providing a passenger density according to the embodiment of the present invention includes a plurality of thumbnail images 6 which are identical to the thumbnail images 6 shown in FIG. 5, and thus a layout for effectively displaying the plurality of thumbnail images 6 on the screen 23 is required. Layouts, which are methods in which the screen 23 of the apparatus 2 for providing a passenger density displays the thumbnail images 6, will be described with reference to FIGS. 6 and 7.

Figure 6:
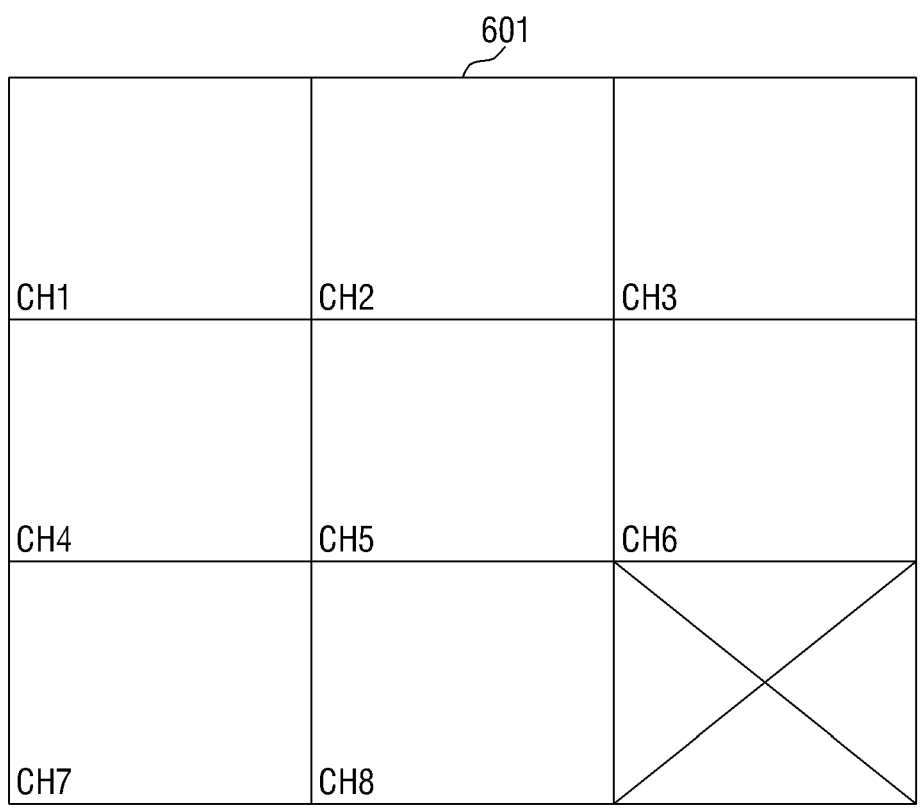
FIG. 6 is a view showing a layout which is configured by the screen of the apparatus for providing a passenger density according to the embodiment of the present invention.

FIG. 6 is a view showing a layout 60 which is configured by the screen 23 of the apparatus 2 for providing a passenger density according to the embodiment of the present invention.

FIG. 6 shows an example of the layout 60 in which eight cameras 4 are connected to the apparatus 2 for providing a passenger density according to the embodiment of the present invention and which includes a total of eight thumbnail images 601.

When densities calculated from the respective original images are the same or a difference therebetween is within a certain range and is not extremely large, the thumbnail images 601 may be formed to have the same size. Therefore, a size obtained by equally dividing the size of an entire display device by the total number of the thumbnail images 601, or the number, which is greater than the total number, is closest to the total number and may equally divide the entire display device becomes the size of the thumbnail image 601. In FIG. 6, since a total of eight thumbnail images 601 should be displayed, the layout 60 is provided in which the size of the entire display device is divided into nine equal parts so that the thumbnail generator 22 determines the size of each of the thumbnail images 601 and arranges the thumbnail images 601. Each of the thumbnail images 601 may be displayed together with the passenger density and the related information, and the layout 60 in which the thumbnail images 601 having the same size are arranged is not limited to that shown in FIG. 6.

Figure 7:
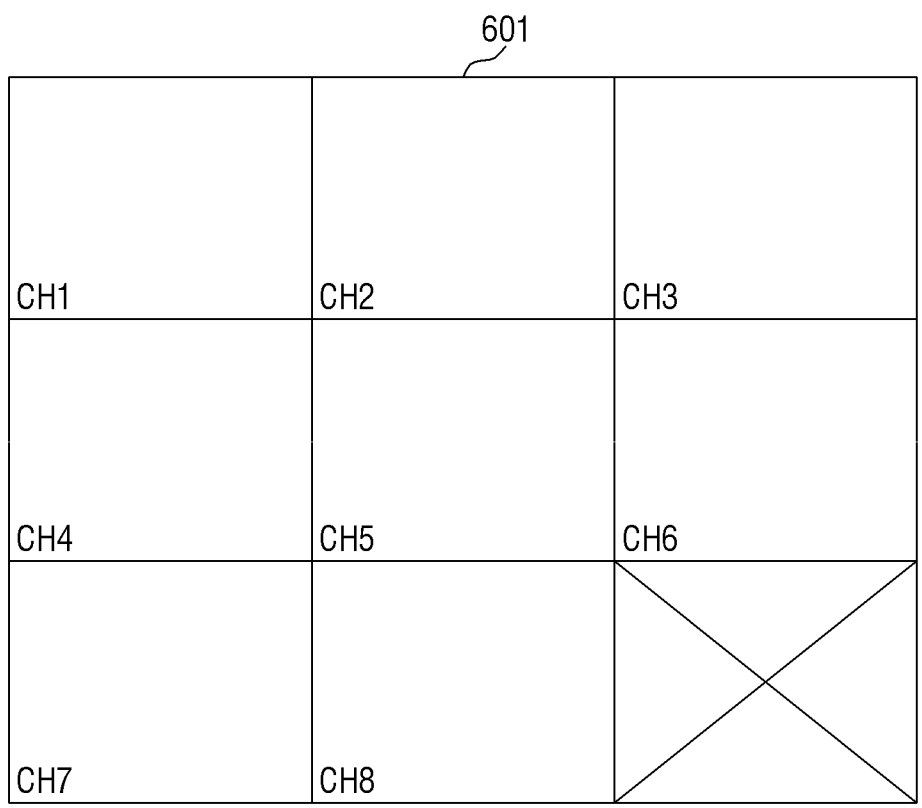
FIG. 7 is a view showing a state in which a layout configured by the screen of the apparatus for providing a passenger density according to the embodiment of the present invention is changed.

FIG. 7 is a view showing a state in which a layout 61 configured by the screen 23 of the apparatus 2 for providing a passenger density according to the embodiment of the present invention is changed.

Referring to FIG. 7, it can be seen that a thumbnail image 611 corresponding to a channel number 1 is formed bigger than other thumbnail images. When the event detector 24 detects an event with respect to an original image corresponding to the specific thumbnail image 611 or when the passenger density of one passenger car 3 is significantly different from the densities of other passenger cars 3 to exceed a certain range, the thumbnail generator 22 determines that the size of the thumbnail image 611 in which the event is detected is greater than the sizes of other thumbnail images. Since the other thumbnail images should be arranged in a remaining region of the screen displayed by the display device, the thumbnail generator 22 equally divides the size of the remaining region by the number of the other thumbnail images to determine the sizes of the thumbnail images, and the screen 23 displays the thumbnail images.

Figure 8:
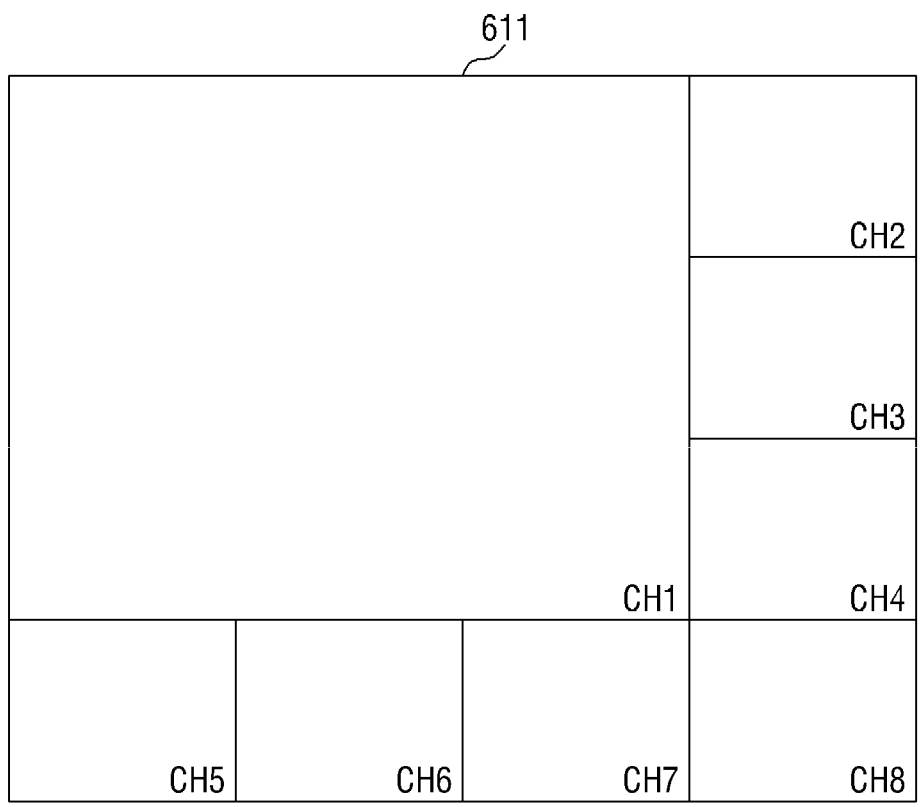
FIG. 8 is a view showing a layout for displaying an alarm when an event is detected in the apparatus for providing a passenger density according to the embodiment of the present invention.

FIG. 8 shows a state in which the event is detected from the original image corresponding to the thumbnail image 611 corresponding to the channel number 1, the corresponding thumbnail image 611 is arranged at an upper left end, and the other thumbnail images are arranged around the thumbnail image 611, but the layout 61 is not limited thereto.

Although not shown, the thumbnail generator 22 may enlarge the sizes of the thumbnail images corresponding to the original images of adjacent passenger cars 3 having a passenger density which is significantly different from a passenger density of another passenger car 3. Accordingly, the thumbnail generator 22 may allow two thumbnail images to be compared so that the user may take note. The user may transmit a guidance message to the overcrowded passenger car 3 to guide the passengers 5 to move to the uncrowded passenger cars 3.

Figure 9:
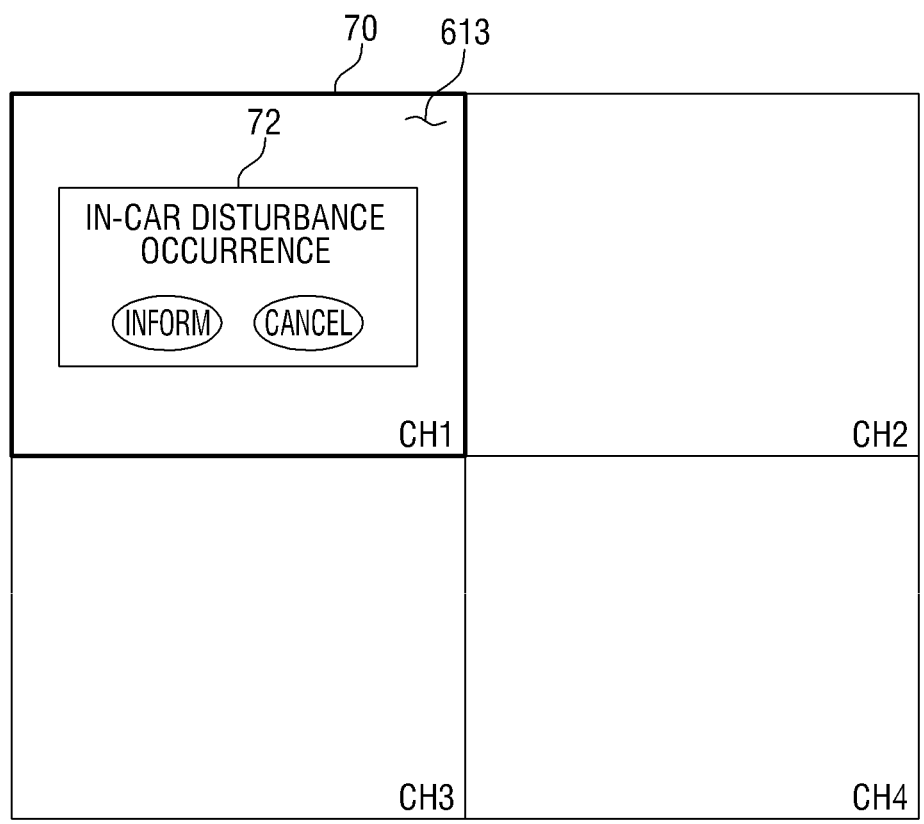
FIG. 9 is a view showing a layout for displaying a selection window when an event is detected in the apparatus for providing a passenger density according to the embodiment of the present invention.

A process of displaying an alarm upon detection of an event will be described with reference to FIGS. 8 and 9.

FIG. 8 is a view showing a layout 62 for displaying an alarm when an event is detected in the apparatus 2 for providing a passenger density according to the embodiment of the present invention. FIG. 9 is a view showing a layout 62 for displaying a selection window 72 when an event is detected in the apparatus 2 for providing a passenger density according to the embodiment of the present invention.

According to the embodiment of the present invention, an alarm about a thumbnail image 613 corresponding to an original image in which an event is detected by the event detector 24 may be additionally displayed. As shown in the drawing, the corresponding thumbnail image 613 may be highlighted with a different color or a thick border 70, a notification marker 71 may be separately displayed at a center of the corresponding thumbnail image 613 to inform the user that the event has occurred, and other thumbnail images may be blurred and highlighted, but the method of displaying an alarm is not limited thereto.

The alarm and the highlight displayed on the screen 23 directs the user's attention to the corresponding thumbnail image 613. However, there may be sufficient situations just by observing a situation occurring in the passenger car 3 carefully by the user, whereas, in some cases, subsequent prompt action by the user may be required. For example, when a security problem in which a drunk passenger makes a disturbance in the passenger car 3 occurs, rapid reporting and provision of photographic evidence may be required. When such a type of event occurs, the apparatus 2 for providing a passenger density may display the selection window 72 together with the alarm as shown in FIG. 9. Information about the type of the event may be displayed on the selection window 72, and a notification button for informing the related organizations of the contents of the occurring event and providing the photographic evidence and a cancel button for terminating the situation may be displayed on the selection window 72. The user may select the notification button using a selection means so that the contents of the event may be automatically transmitted to the related organizations such as police stations, fire stations, and the like and the original image stored in the storage 25 at the time when the event occurs may be provided as the photographic evidence.

Figure 10:
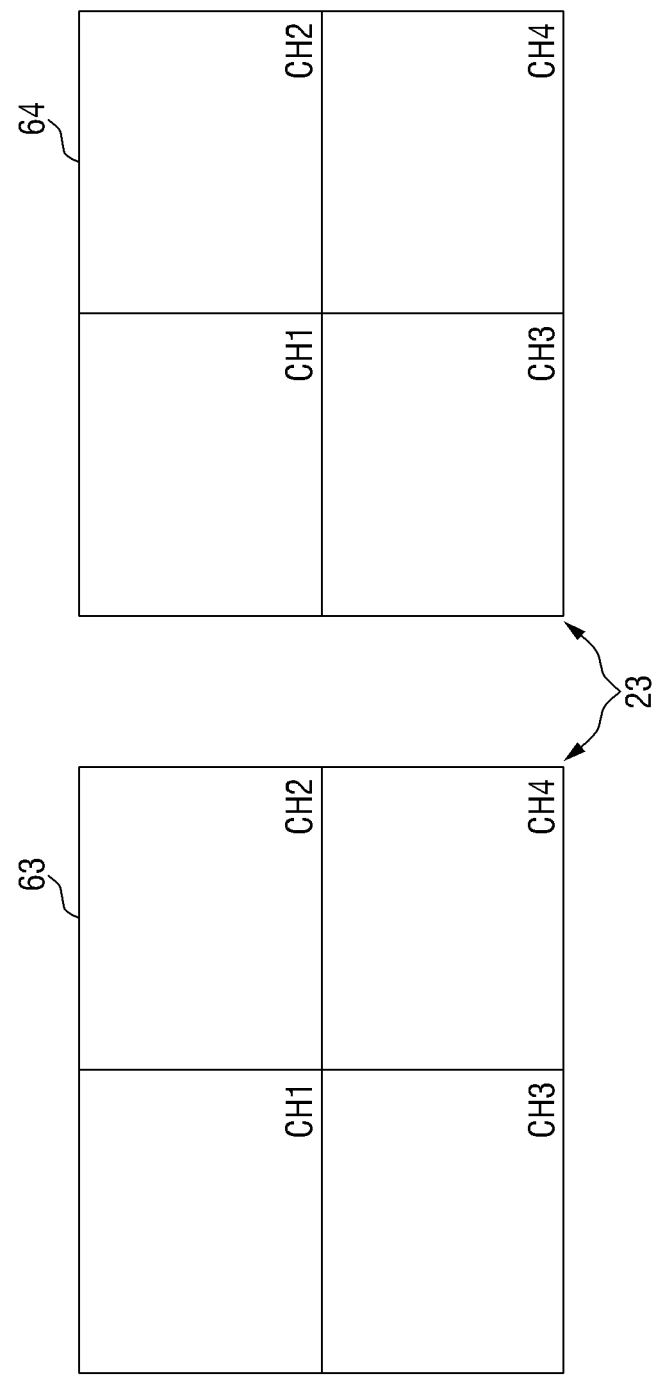
FIG. 10 is a view showing a case in which the screen of the apparatus for providing a passenger density according to the embodiment of the present invention includes a plurality of display devices.

FIG. 10 is a view showing a case in which the screen 23 of the apparatus 2 for providing a passenger density according to the embodiment of the present invention includes a plurality of display devices.

Referring to FIG. 10, the screen 23 of the apparatus 2 for providing a passenger density according to the embodiment of the present invention may include a single display device or may include a plurality of display devices. FIG. 10 shows a case in which the screen 23 includes two display devices.

When the screen 23 includes a plurality of display devices, it is not necessary to display all of the thumbnail images on one display device, and therefore, layouts 63 and 64 for dividing and displaying the thumbnail images on the respective display devices may be provided.

In the apparatus 2 for providing a passenger density according to the embodiment of the present invention, the thumbnail image corresponding to the original image in which the event is detected for reasons such as the passenger density becoming a certain value or more and the like may be output onto one display device as a whole screen, and the remaining thumbnail images may be equally divided and displayed on the other display device.

In an apparatus 2 for providing a passenger density according to another embodiment of the present invention, when a single thumbnail image is output onto a whole screen in the above situation, the corresponding thumbnail image may be output for a predetermined time and then another thumbnail image may be output for a predetermined time. In this manner, all of the thumbnail images may be sequentially output onto the whole screen for the predetermined time.

Hereinafter, a method of providing a passenger density according to an embodiment of the present invention will be described with reference to flowcharts.

Figure 11:
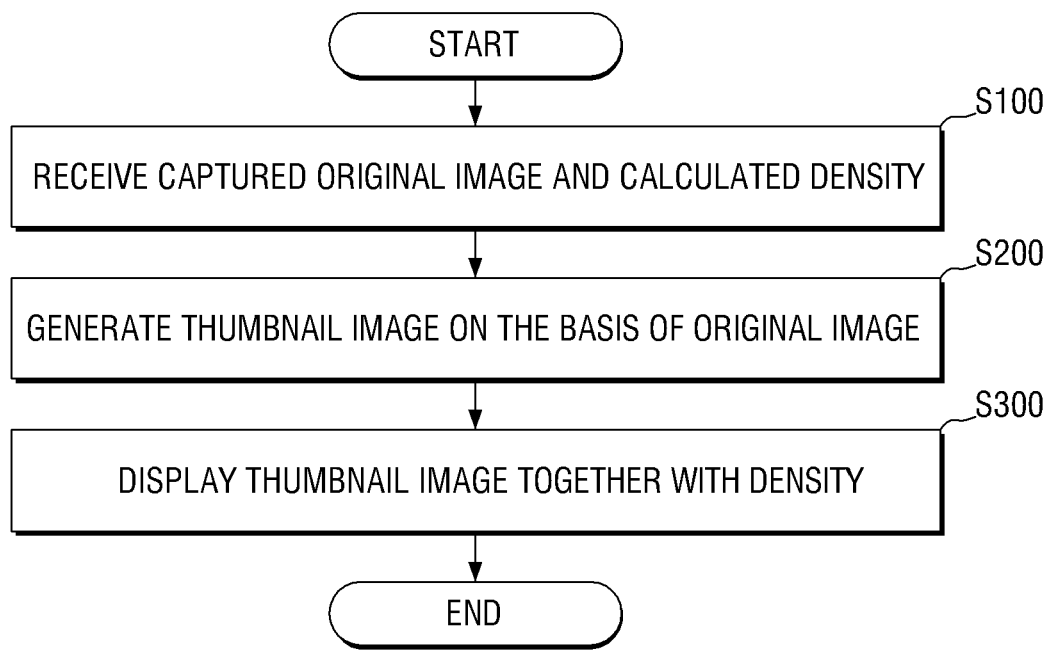
FIG. 11 is a flowchart showing a method of providing a passenger density according to an embodiment of the present invention.

FIG. 11 is a flowchart showing the method of providing a passenger density according to the embodiment of the present invention.

The receiver 21 included in the apparatus 2 for providing a passenger density according to the embodiment of the present invention receives an original image captured by the camera 4 and a passenger density calculated by the camera 4 (S100). The received original image is transmitted to the thumbnail generator 22 and a thumbnail image is generated based on the original image (S200). The generated thumbnail image is transmitted to the screen 23 and displayed on the display device together with the transmitted passenger density (S300). A process of generating the thumbnail image will be described in detail with reference to a flowchart of FIG. 12.

Figure 12:
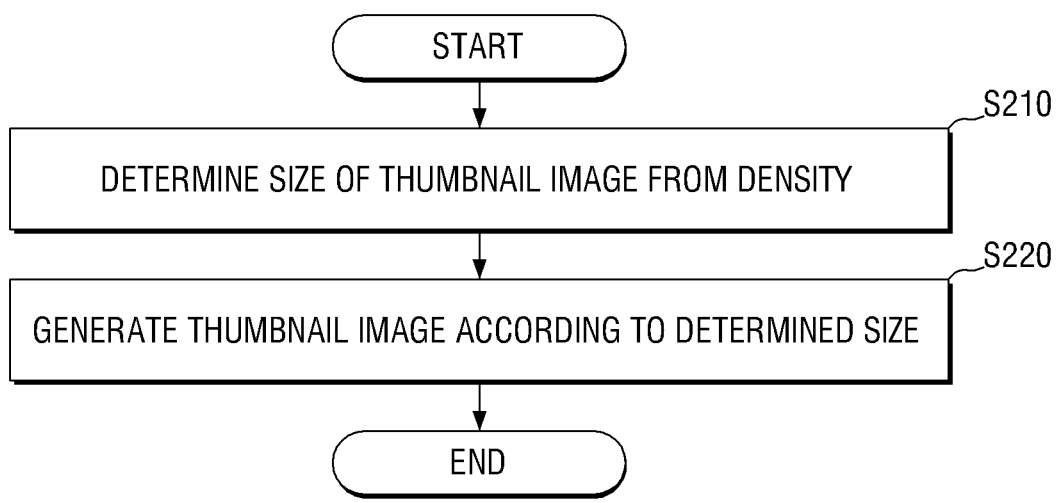
FIG. 12 is a flowchart for describing a method of generating a thumbnail image according to a passenger density in the method of providing a density according to the embodiment of the present invention.

FIG. 12 is a flowchart for describing the method of generating a thumbnail image according to the passenger density in the method of providing a passenger density according to the embodiment of the present invention.

The thumbnail generator 22 determines a size of a thumbnail image which will be generated, from the received passenger density (S210). In addition, the thumbnail generator 22 may determine the size of the thumbnail image based on whether an event is detected, which is received from the event detector 24. Generally, most of the thumbnail images may be configured smaller than the original image. However, the thumbnail images may be generated to be larger than the original image according to the passenger density of the corresponding original image, a change of the passenger density, and whether an event is detected.

The thumbnail generator 22 generates a thumbnail image from the original image according to the determined size (S220). A layout for arranging the generated thumbnail image is generated, and the generated thumbnail image is transmitted to the screen 23 and displayed on the screen 23.

Figure 13:
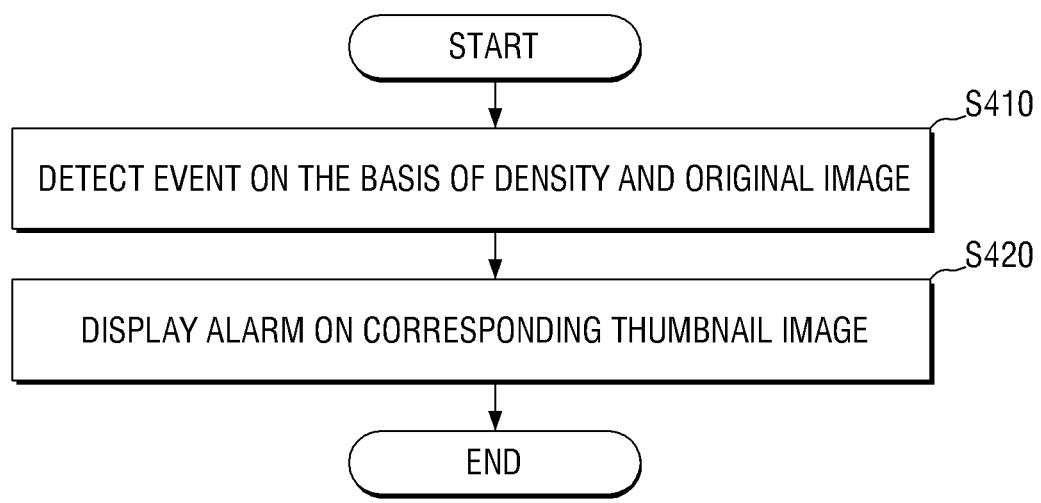
FIG. 13 is a flowchart for describing a method of detecting an event and displaying an alarm in the method of providing a passenger density according to the embodiment of the present invention.

FIG. 13 is a flowchart for describing a method of detecting an event and displaying an alarm in the method of providing a passenger density according to the embodiment of the present invention.

The apparatus 2 for providing a passenger density according to the embodiment of the present invention may detect an event from the received passenger density and original image using the event detector 24 (S410). Examples of the event include situations such as movement of an object desired to be observed or a sudden change in passenger density, but the present invention is not limited thereto. The event detector 24 may also detect the event using the image recognition method described above.

When the event is detected, the screen 23 displays an alarm for the thumbnail image in which the event is detected (S420). It is possible to highlight a display such that the border 70 is made thick or has a different color, a separate notification message may be displayed, and the selection window 72 may be further displayed as described above.

Figure 14:
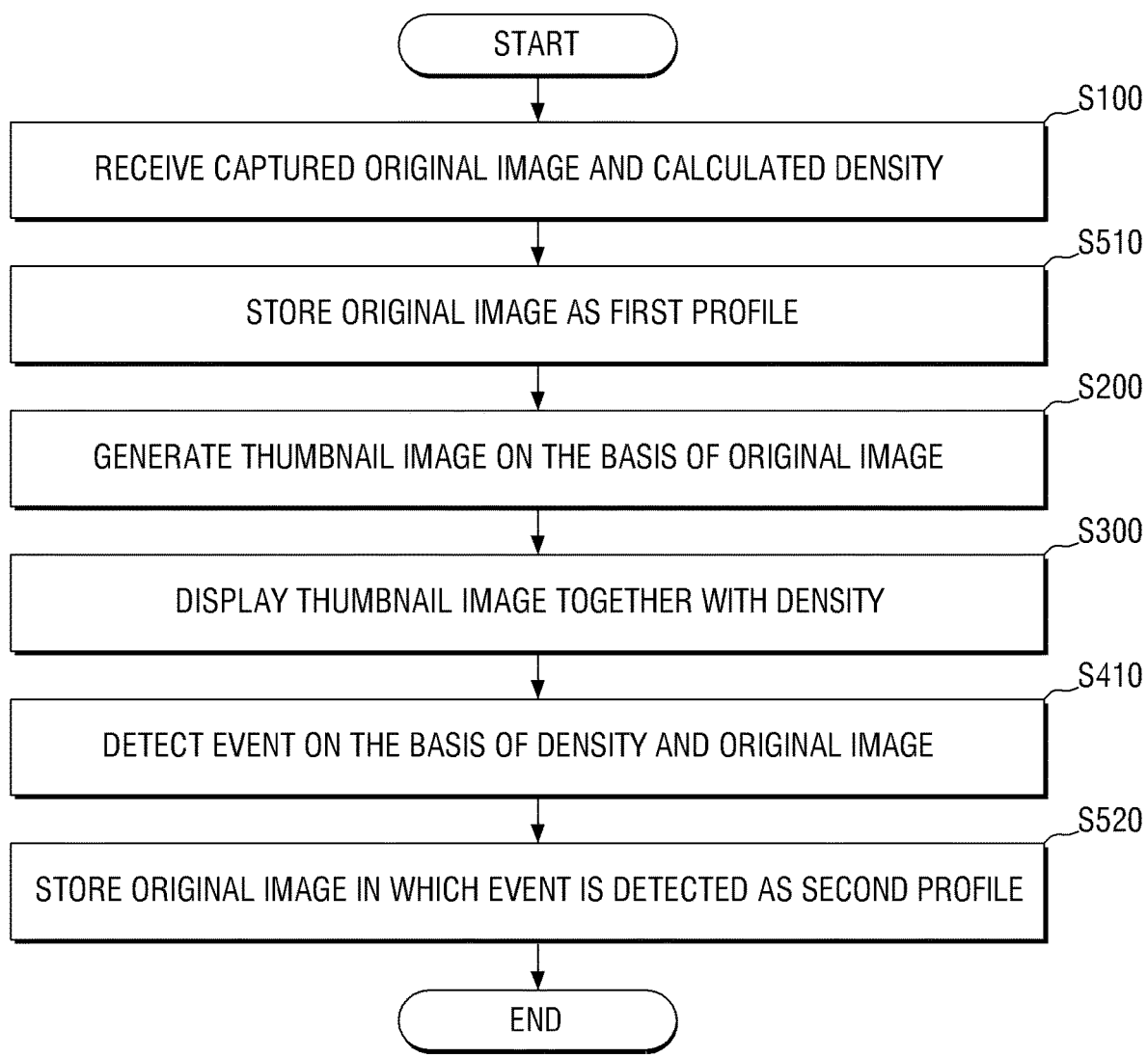
FIG. 14 is a flowchart for describing a method of changing a storage profile in the method of providing a passenger density according to the embodiment of the present invention.

FIG. 14 is a flowchart for describing a method of changing a storage profile in the method of providing a passenger density according to the embodiment of the present invention.

The received original image is stored in the storage 25 as a first profile, which is a record profile (S510). However, when an event is detected from the passenger density and the original image (S410), the original image in which the event is detected is stored in the storage 25 as a second profile, which is a record profile (S520). In this case, the second profile may be a profile that occupies more capacity when capturing for the same time compared to the first profile. This makes it possible for the user to view the stored image with higher quality, which facilitates later observation of the event situation.

Figure 15:
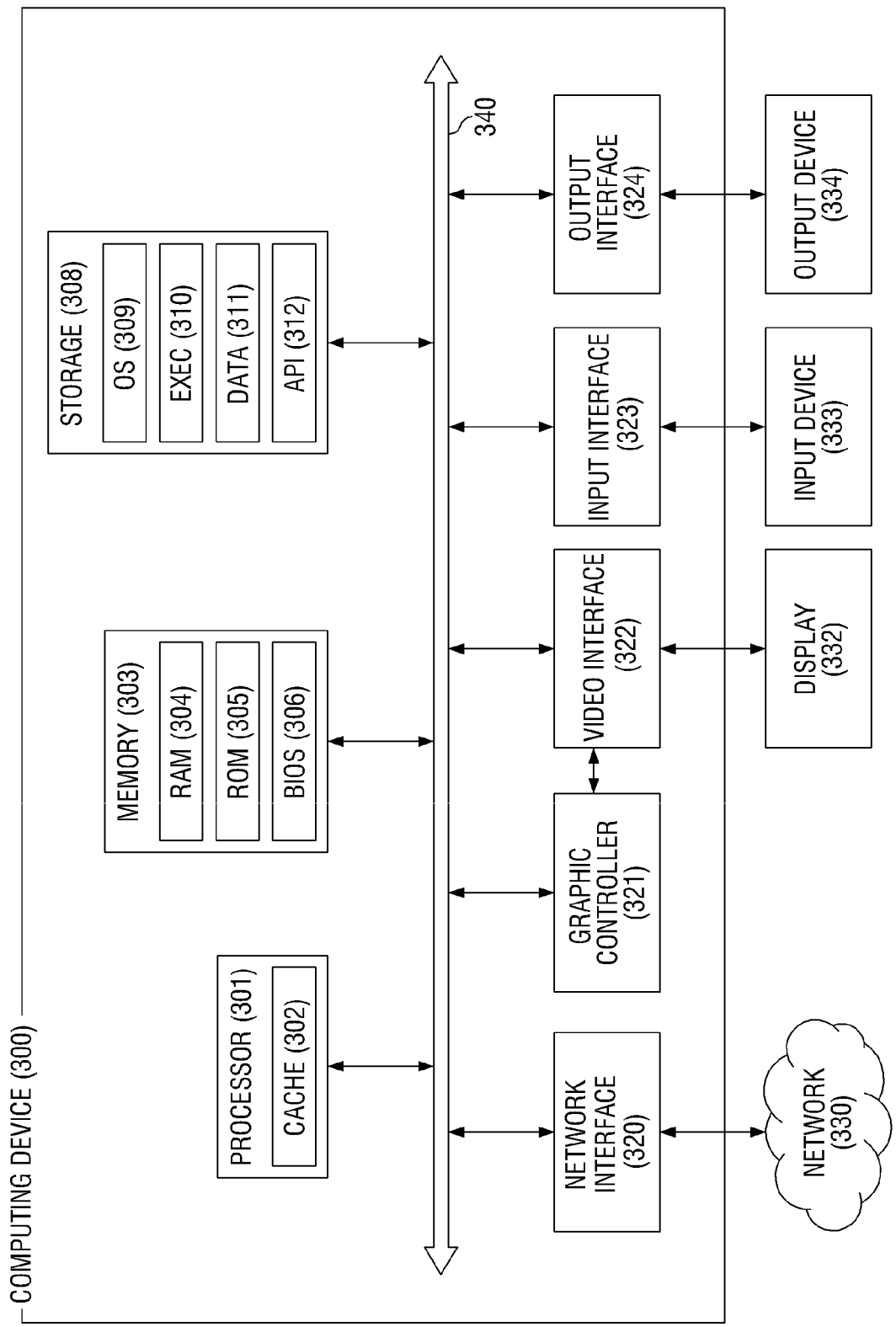
FIG. 15 is a block diagram showing a configuration of a computing device by which the apparatus for providing a passenger density of the present invention may be implemented.

The apparatus for providing a passenger density according to the embodiment of the present invention described above may be implemented, for example, with the following computing device shown in FIG. 15. A computing device 300 may be a mobile handheld device (a smartphone, a tablet computer, etc.), a laptop or notebook computer, a distributed computer system, a computing grid, or a server, but the present invention is not limited thereto. The computing device 300 may include a processor 301, a memory 303, and a storage 308 that communicate with each other or with other components via a bus 340. The bus 340 may be connected to a display 332, one or more input devices 333, and one or more output devices 334.

All of these components may be connected to the bus 340 directly or through one or more interfaces or adapters. The bus 340 is connected to a wide range of subsystems. The bus 340 may include a memory bus, a memory controller, a peripheral bus, a local bus, and combinations thereof.

The processor 301 or a CPU optionally includes a cache memory 302, which is a local storage for temporarily storing instructions, data, or computer addresses. The processor 301 executes instructions (or software modules) recorded in a computer-readable storage medium, such as the memory 303 or the storage 308. The computer-readable storage medium may store software modules (e.g., the thumbnail generator 22, the event detector 24, and the passenger density calculator 43) that implement particular embodiments, and the processor 301 may execute the stored software modules.

The memory 303 may include a random access memory (RAM) 304, a read-only memory (ROM) 305, and combinations thereof. In addition, Basic Input/Output System (BIOS) (or firmware) having basic routines necessary for booting within the computing device 300 may be included in the memory 303.

The storage 308 is used for storing an operating system 309, executable files (EXECs) 310, data 311, an application programming interface (API) application 312, and the like. The storage 308 may include an HDD, an optical disk drive, an SSD, and the like.

The computing device 300 may include the input device 333. The user may input commands and/or information to the computer device 300 through the input device 333. Examples of the input device 333 include a keyboard, a mouse, a touch pad, a joystick, a game pad, a microphone, an optical scanner, a camera, and the like. The input device 333 may be connected to the bus 340 through an input interface 323 including a serial port, a parallel port, a game port, a Universal Serial Bus (USB), and the like.

In a particular embodiment, the computing device 300 is connected to a network 330. The computing device 300 is connected to other devices via the network 330. In this case, the network interface 320 (e.g., the receiver 21 or the transmitting part 41) receives communication data in the form of one or more packets (e.g., Internet Protocol (IP) packets) from the network 330, and the computing device 300 stores the received communication data for processing by the processor 301. In the same manner, the computing device 300 stores the transmitted communication data in the form of one or more packets in the memory 303, and the network interface 320 transmits the communication data to the network 330.

The network interface 320 may include a network interface card, a modem, and the like. Examples of the network 330 may include the Internet, a wide area network (WAN), a local area network (LAN), a telephone network, a direct connection communication, and the like, and a wired and/or wireless communication method may be employed to the network interface 320.

An execution result of the software module by the processor 301 may be displayed through the display 332 (e.g., the screen 23). Examples of the display 332 include a liquid crystal display (LCD), an organic light-emitting diode (OLED), a cathode ray tube (CRT), a plasma display panel (PDP), and the like. The display 332 may be connected to the bus 340 through a video interface 322, and data transmission between the display 332 and the bus 340 may be controlled by a graphic controller 321.

In addition to the display 332, the computing device 300 may include one or more output devices 334 such as audio speakers, printers, and the like. The output device is connected to the bus 340 through an output interface 324. The output interface 324 may include, for example, a serial port, a parallel port, a game port, a USB, and the like.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An apparatus for displaying images and a passenger density, the apparatus comprising:
   a receiver to receive original images obtained by a plurality of cameras installed in a plurality of passenger cars and a passenger density calculated from the original images;
   a thumbnail generator to determine sizes of thumbnail images corresponding to the original images according to the number of the plurality of cameras and to generate thumbnail images according to the determined sizes; and
   a screen to collect the thumbnail images and to display the thumbnail images together with information indicating the passenger density,
   wherein the thumbnail generator is configured to determine the sizes of the thumbnail images according to the passenger density and to generate different sizes of the thumbnail images according to the determined sizes.

2. The apparatus of claim 1, further comprising an event detector to detect an event based on the original images and the passenger density,
   wherein the screen is operable to further display an alarm on the thumbnail image corresponding to the original image in which the event is detected.

3. The apparatus of claim 2, further comprising a storage to store the original images as a first profile,
   wherein the storage is operable to store the original image in which the event is detected as a second profile.

4. The apparatus of claim 2, wherein the event detector is operable to detect an event defined by a change of the passenger density greater than or equal to a threshold value for a predetermined period of time.

5. The apparatus of claim 2, wherein the screen is operable to further display a selection window and to receive information indicating the detected event and whether the original image in which the event is detected is transmitted from a user.

6. The apparatus of claim 1, wherein the screen comprises a plurality of display devices.

7. The apparatus of claim 1, wherein the screen is operable to sequentially display the thumbnail images for a predetermined time.

8. The apparatus of claim 1, further comprising an air conditioner controller to control an air conditioner so as to adjust a temperature in one of the plurality of passenger cars using a temperature in the one of the plurality of passenger cars, the temperature of the one of the plurality of passenger cars being calculated from the passenger density of the one of the plurality of passenger cars.

9. An apparatus for displaying images and a passenger density, the apparatus comprising:
   a receiver to receive original images obtained by a plurality of cameras each installed in a plurality of passenger cars;
   a passenger density calculator to calculate a passenger density in each of the plurality of passenger cars from the original images;
   a thumbnail generator to determine sizes of thumbnail images corresponding to the original images according to the number of the plurality of cameras and to generate thumbnail images according to the determined sizes; and
   a screen to collect the thumbnail images and to display the thumbnail images together with information indicating the passenger density,
   wherein the thumbnail generator is configured to determine the sizes of the thumbnail images according to the passenger density and to generate different sizes of the thumbnail images according to the determined sizes.

10. A method of displaying images and a passenger density, the method comprising the steps of:
    receiving, by a receiver, original images obtained by a plurality of cameras installed in a plurality of passenger cars and a passenger density calculated from each of the original images;
    determining, by a thumbnail generator, sizes of thumbnail images corresponding to the original images according to the number of the plurality of cameras;
    generating, by the thumbnail generator, thumbnail images according to the determined sizes; and
    collecting, by a screen, the thumbnail images and displaying the thumbnail images together with information indicating the passenger density,
    wherein:
    the step of determining the sizes of the thumbnail images comprises the step of determining the sizes of the thumbnail images according to the passenger density; and
    the step of generating the thumbnail images comprises generating different sizes of the thumbnail images according to the determined sizes.

11. The method of claim 10, further comprising the step of detecting, by an event detector, an event based on the original images and the passenger density,
    wherein the step of displaying of the thumbnail images by the screen comprises the step of displaying an alarm on the thumbnail image corresponding to the original image in which the event is detected.

12. The method of claim 11, further comprising the step of storing, by a storage, the received original images as a first profile.

13. The method of claim 12, wherein the step of storing of the received original images comprises storing the original image in which the event is detected as a second profile.

14. The method of claim 11, wherein the step of detecting of the event comprises the step of detecting an event when a change of the passenger density is greater than or equal to a threshold value for a predetermined period of time.

15. The method of claim 11, wherein the step of displaying of the thumbnail images comprises the steps of:
    displaying, by the screen, a selection window; and
    receiving information indicating the event and whether the original image in which the event is detected is transmitted from a user.

16. The method of claim 10, wherein the step of displaying of the thumbnail images by the screen comprises the steps of dividing and displaying the thumbnail images on a plurality of display devices included in the screen together with the information indicating the passenger density.

17. The method of claim 10, wherein the step of displaying of the thumbnail images comprises the step of sequentially displaying the thumbnail images for a predetermined time.

18. The method of claim 10, further comprising the step of controlling an air conditioner so as to adjust a temperature in one of the plurality of passenger cars using a temperature in the one of the plurality of passenger cars, the temperature of the one of the plurality of passenger cars is calculated from the passenger density of the one of the plurality of passenger cars.

\* \* \* \* \*